(12) United States Patent
Knuteson et al.

(10) Patent No.: US 8,678,657 B1
(45) Date of Patent: Mar. 25, 2014

(54) POLYCRYSTALLINE DIAMOND BEARING PADS WITH BEARING PORTIONS EXHIBITING DIFFERENT WEAR RATES AND RELATED BEARING ASSEMBLIES AND APPARATUSES

(75) Inventors: Cody W. Knuteson, Salem, UT (US); Craig H. Cooley, Saratoga Springs, UT (US); Timothy N. Sexton, Genola, UT (US)

(73) Assignee: US Synthetic Corporation, Orem, UT (US)

( * ) Notice: Subject to any disclaimer, the term of this patent is extended or adjusted under 35 U.S.C. 154(b) by 9 days.

(21) Appl. No.: 13/267,027

(22) Filed: Oct. 6, 2011

(51) Int. Cl.
  *F16C 33/24* (2006.01)
  *F16C 33/00* (2006.01)
  *F16C 3/00* (2006.01)
  *F16C 17/04* (2006.01)

(52) U.S. Cl.
  USPC ............ 384/282; 384/95; 384/97; 384/276

(58) Field of Classification Search
  USPC ............ 384/95, 97, 276, 282, 285, 303, 420; 175/371, 372, 434
  See application file for complete search history.

(56) References Cited

U.S. PATENT DOCUMENTS

| | | | | |
|---|---|---|---|---|
| 6,684,966 | B2 * | 2/2004 | Lin et al. | 175/372 |
| 7,703,982 | B2 * | 4/2010 | Cooley | 384/95 |
| 2006/0162967 | A1 | 7/2006 | Brackin et al. | |
| 2007/0081749 | A1 * | 4/2007 | Sexton et al. | 384/420 |
| 2010/0200305 | A1 * | 8/2010 | Griffin et al. | 175/434 |
| 2010/0275523 | A1 * | 11/2010 | Tank | 51/307 |
| 2010/0282519 | A1 * | 11/2010 | Zhang et al. | 175/434 |
| 2013/0000993 | A1 * | 1/2013 | Shabalala et al. | 175/434 |

OTHER PUBLICATIONS

U.S. Appl. No. 11/545,929, filed Oct. 10, 2006, Bertagnolli et al.
U.S. Appl. No. 12/761,535, filed Apr. 16, 2010, Scott et al.

* cited by examiner

*Primary Examiner* — Thomas R Hannon
*Assistant Examiner* — Kashif Mohammed
(74) *Attorney, Agent, or Firm* — Dorsey & Whitney LLP

(57) ABSTRACT

Various embodiments relate to polycrystalline diamond ("PCD") bearing pads having first and second bearing pad portions that exhibit different wear rates, and bearing assemblies and apparatuses (e.g., thrust-bearing apparatuses and radial bearing apparatuses) that utilize such PCD bearing pads. In an embodiment, a PCD bearing pad for use in a bearing assembly of a subterranean drilling system includes a PCD bearing pad body including a plurality of directly-bonded together diamond grains. The PCD bearing pad body further includes a first bearing pad portion exhibiting a first wear resistance, and a second bearing pad portion exhibiting a second wear resistance greater than the first wear resistance.

32 Claims, 14 Drawing Sheets

POLYCRYSTALLINE DIAMOND BEARING PADS WITH BEARING PORTIONS EXHIBITING DIFFERENT WEAR RATES AND RELATED BEARING ASSEMBLIES AND APPARATUSES

BACKGROUND

Subterranean drilling systems that employ downhole drilling motors are commonly used for drilling boreholes in the earth for oil and gas exploration and production. A subterranean drilling system typically includes a downhole drilling motor that is operably connected to an output shaft. A pair of thrust-bearing apparatuses also can be operably coupled to the downhole drilling motor. A rotary drill bit configured to engage a subterranean formation and drill a borehole is connected to the output shaft. As the borehole is drilled with the rotary drill bit, pipe sections may be connected to the subterranean drilling system to form a drill string capable of progressively drilling the borehole to a greater depth within the earth.

Each thrust-bearing apparatus includes a stator that does not rotate and a rotor that is attached to the output shaft and rotates with the output shaft. The stator and rotor each includes a plurality of bearing elements that may be fabricated from polycrystalline diamond compacts ("PDCs") that provide diamond bearing surfaces that bear against each other during use.

In operation, high-pressure drilling fluid is circulated through the drill string and power section of the downhole drilling motor, usually prior to the rotary drill bit engaging the bottom of the borehole, to generate torque and rotate the output shaft and the rotary drill bit attached to the output shaft. When the rotary drill bit engages the bottom of the borehole, a thrust load is generated, which is commonly referred to as "on-bottom thrust" that tends to compress and is carried, at least in part, by one of the thrust-bearing apparatuses. Fluid flow through the power section may cause what is commonly referred to as "off-bottom thrust," which is carried, at least in part, by the other thrust-bearing apparatus. The drilling fluid used to generate the torque for rotating the rotary drill bit exits openings formed in the rotary drill bit and returns to the surface, carrying cuttings of the subterranean formation through an annular space between the drilled borehole and the subterranean drilling system. Typically, a portion of the drilling fluid is diverted by the downhole drilling motor to cool and lubricate the bearing elements of the thrust-bearing apparatuses.

The on-bottom and off-bottom thrust carried by the thrust-bearing apparatuses can be extremely large. The operational lifetime of the thrust-bearing apparatuses often determines the useful life of the subterranean drilling system. Therefore, manufacturers and users of subterranean drilling systems continue to seek improved bearing apparatuses to extend the useful life of such bearing apparatuses.

SUMMARY

Various embodiments of the invention relate to PCD bearing pads having first and second bearing pad portions that exhibit different wear rates, and bearing assemblies and apparatuses (e.g., thrust-bearing apparatuses and radial bearing apparatuses) that utilize such PCD bearing pads. As the first and second bearing pad portions of the PCD bearing pads exhibit different wear rates, the first and second bearing pad portions wear away at different rates so that a step/offset is formed between respective superhard bearing surfaces of the first and second bearing pad portions that promotes fluid film formation at lower speeds and higher loads to thereby enhance the operational lifetime of a bearing apparatus incorporating such PCD bearing pads.

In an embodiment, a PCD bearing pad for use in, for example, a bearing assembly of a subterranean drilling system includes a PCD bearing pad body including a plurality of directly-bonded together diamond grains. The PCD bearing pad body further includes a first bearing pad portion exhibiting a first wear resistance, and a second bearing pad portion exhibiting a second wear resistance greater than the first wear resistance.

In an embodiment, a bearing assembly includes a support ring and a plurality of PCD bearing pads mounted to the support ring and distributed circumferentially about an axis. Each PCD bearing pad includes a plurality of directly-bonded together diamond grains. A number of the PCD bearing pads includes a first bearing pad portion exhibiting a first wear resistance, and a second bearing pad portion exhibiting a second wear resistance greater than the first wear resistance.

In an embodiment, a bearing apparatus includes two bearing assemblies. At least one of the two bearing assemblies may be configured as any of the disclosed bearing assembly embodiments.

Other embodiments include downhole motors for use in drilling systems and subterranean drilling systems that may utilize any of the disclosed bearing apparatuses.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the invention, wherein identical reference numerals refer to identical elements or features in different views or embodiments shown in the drawings.

DETAILED DESCRIPTION

Various embodiments of the invention relate to PCD bearing pads having first and second bearing pad portions that exhibit different wear rates, and bearing assemblies and apparatuses (e.g., thrust-bearing apparatuses and radial bearing apparatuses) that utilize such PCD bearing pads. As the first and second bearing pad portions of the PCD bearing pads exhibit different wear rates, the first and second bearing pad portions wear away at different rates so that a step/offset/transition is formed between respective superhard bearing surfaces of the first and second bearing pad portions that promotes fluid film formation (e.g., at lower speeds and higher loads) to thereby enhance the operational lifetime of a bearing apparatus incorporating such PCD bearing pads. The disclosed bearing apparatuses may be used in a number of applications, such as downhole motors in subterranean drilling systems, directional drilling systems, pumps, transmissions, gear boxes, and many other apparatuses.

Figure 1A:
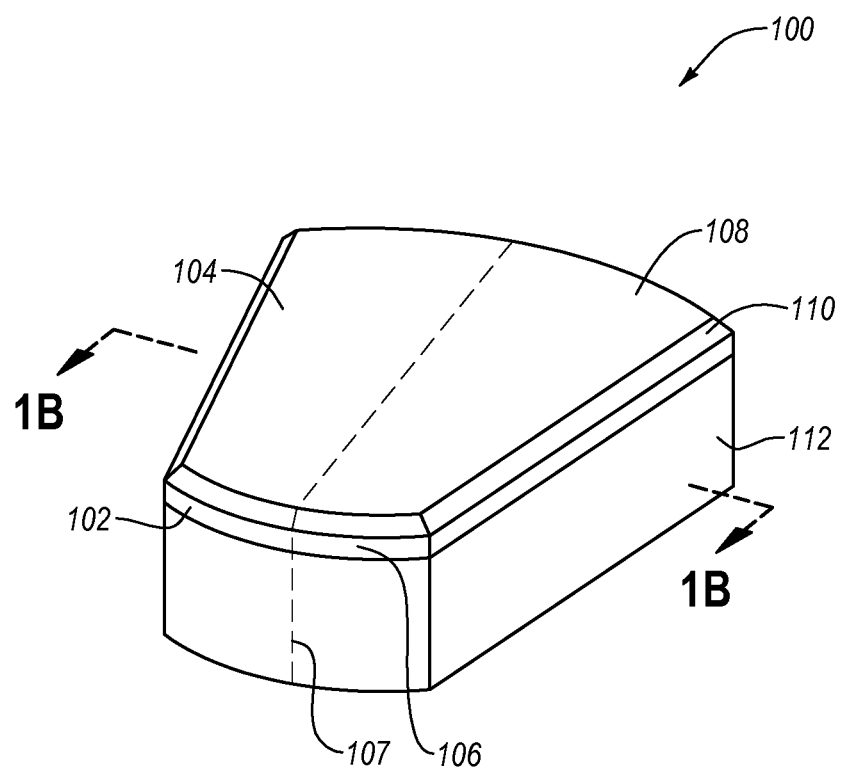
FIG. 1A is an isometric view of an embodiment of a PCD bearing pad including first and second bearing pad portions that exhibit different wear rates.
Figure 1B:
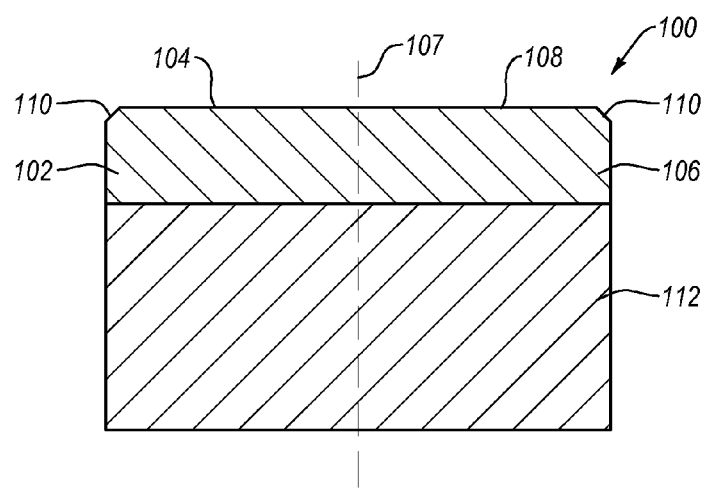
FIG. 1B is a side cross-sectional view of the PCD bearing pad shown in FIG. 1A taken along line 1B-1B.

FIGS. 1A and 1B are isometric and side cross-sectional views, respectively, of an embodiment of a PCD bearing pad 100. The PCD bearing pad 100 includes a first bearing pad portion 102 having a first superhard bearing surface 104 and a second bearing pad portion 106 having a second superhard bearing surface 108. The first and second bearing pad portions 102 and 106 collectively form a PCD bearing pad body/table (shown with an optional peripherally-extending chamfer 110) that is bonded to a substrate 112. In some embodiments, the first and second bearing pad portions 102 and 106 are integrally formed with each other and the substrate 112. However, in other embodiments, the first and second bearing pad portions 102 and 106 may be preformed PCD bodies that are each bonded to the substrate 112, such as at least partially leached PCD bodies that are brazed to the substrate 112 or infiltrated with a metallic cementing constituent from the substrate 112, or sintered PCD bodies each having a different average grain size and/or catalyst content.

The substrate 112 may include, without limitation, cemented carbides, such as tungsten carbide, titanium carbide, chromium carbide, niobium carbide, tantalum carbide, vanadium carbide, or combinations thereof cemented with iron, nickel, cobalt, or alloys thereof. In an embodiment, the substrate 112 comprises cobalt-cemented tungsten carbide. Although a back surface of the PCD bearing pad body is depicted in FIGS. 1A and 1B as being substantially planar, in other embodiments, the back surface may exhibit a selected nonplanar topography and the substrate 112 may exhibit a correspondingly configured interfacial surface or other selected interfacial surface.

The first bearing pad portion 102 exhibits a first wear resistance and the second bearing pad portion 106 exhibits a second wear resistance. As merely one example of a test methodology, the first and second wear resistances can be measured by separately cutting a workpiece (e.g., a granite workpiece) using the first and second bearing pad portions 102 and 106 in a vertical turret lathe test fixture under substantially the same test conditions to determine respective wear ratios for the first and second bearing pad portions 102 and 106. The second wear resistance of the second bearing pad portion 106 is greater than that of the first wear resistance of the first bearing pad portion 102. For example, the second wear resistance may be at least about 10%, about 10% to about 90%, about 10% to about 50%, about 25% to about 45%, or about 55% to about 75% greater than the first wear resistance. As will be discussed in more detail below, the greater wear resistance of the second bearing pad portion 106 may be due to a difference in composition and/or an average diamond grain size with the first bearing pad portion 102.

Figure 1C:
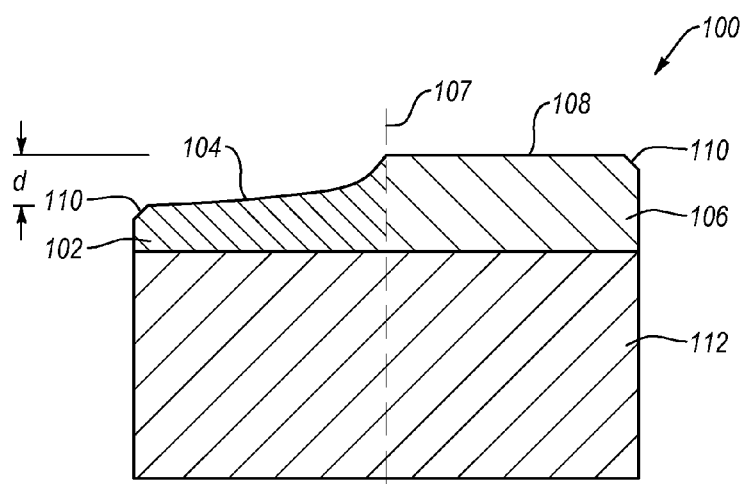
FIG. 1C is a cross-sectional view of the PCD bearing pad shown in FIG. 1A taken along line 1B-1B illustrating how the first and second bearing pad portions wear at different rates so the superhard bearing surfaces thereof become offset/transitioned according to an embodiment.
Figure 1D:
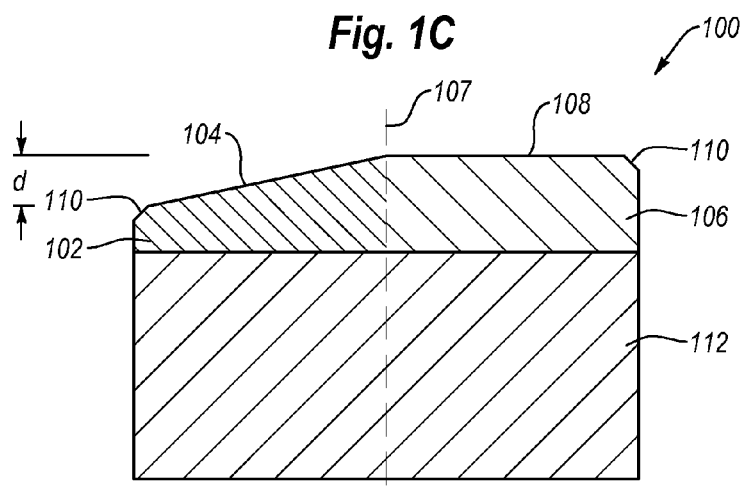
FIG. 1D is a cross-sectional view of the PCD bearing pad shown in FIG. 1A taken along line 1B-1B illustrating how the first and second bearing pad portions wear at different rates so the superhard bearing surfaces thereof become offset/transitioned according to another embodiment.

As shown in the cross-sectional view of the PCD bearing pad 100 in FIG. 1C, as the PCD bearing pad 100 wears during use, the first superhard bearing surface 104 of the first bearing pad portion 102 preferentially wears over the second superhard bearing surface 108 of the second bearing pad portion 106 so that it becomes offset/transitioned by a maximum distance "d" from the second superhard bearing surface 108 due to the greater wear resistance of the second bearing pad portion 106 relative to the first bearing pad portion 102. For example, the maximum distance "d" may be about 50 µm to about 500 µm, such as about 100 µm to about 300 µm. The offset/transition may promote fluid film formation on the first and second superhard bearing surfaces 104 and 108 of the PCD bearing pad 100 (e.g., at lower speeds and higher loads), thereby enhancing the operational lifetime of a bearing apparatus including the PCD bearing pads 100. In other embodiments, the offset/transition between the first and second bearing pad portions 102 and 102 may be preformed, such as by electrical-discharge machining ("EDM"), grinding, lapping, another method, or combinations thereof. In the embodiment shown in FIG. 1C, the offset/transition is shown as being rather gradual. However, in other embodiments, the offset/transition may be less gradual as shown, for example, in FIG. 1D.

The first and second bearing pad portions 102 and 106 may be substantially symmetrically arranged about a plane of symmetry 107 of the PCD bearing pad 100. However, in other embodiments, the first and second bearing pad portions 102 and 106 may have different geometries and may not be symmetric.

The first and second bearing pad portions 102 and 106 may each be made from a number of different PCD materials that includes a plurality of directly bonded-together diamond grains that exhibit diamond-to-diamond bonding (e.g., $sp^3$ bonding). However, in other embodiments, the first and second bearing pad portions 102 and 106 may be formed from so-called resin bonded diamond including abrasive diamond grit bonded in a resin matrix or other matrix such as a metallic matrix of, for example, copper or a copper alloy.

Generally, different wear resistance of the first and second bearing pad portions 102 and 106 may be achieved by varying a composition, HPHT processing, other manufacturing methods, leaching, diamond grain size, another characteristic, or combinations thereof with respect to each of the first and second bearing pad portions 102 and 106. In an embodiment, in order to impart the differential wear resistance to the first and second bearing pad portions 102 and 106, the first bearing pad portion 102 exhibits a first average diamond grain size that is greater than a second average diamond grain size exhibited by second bearing pad portion 106. For example, the first average grain size of the first bearing pad portion 104 may be about 1.2 to about 5 times (e.g., about 1.5 to about 3 times or about 2 to about 4 times) greater than the second average grain size of the second bearing pad portion 106. More particularly, the first average grain size may be greater than about 30 μm and the second average grain size may be less than about 20 μm, such as the first average grain size being about 30 μm to about 100 μm and the second average grain size being about 2 μm to about 20 μm, such as the first average grain size being about 35 μm to 60 μm and the second average grain size being about 10 μm to about 19 μm.

In another embodiment for imparting differential wear resistance to the first and second bearing pad portions 102 and 106, the respective compositions of the first and second bearing pad portions 102 and 106 may be different. In some embodiments, the first bearing pad portion 102 may include a higher content of metal-solvent catalyst than that of the second bearing pad portion 106. The metal-solvent catalyst is used to catalyze formation of PCD during an HPHT sintering process and resides in the interstitial regions between bonded-together diamond grains of the first and second bearing pad portions 102 and 106. For example, the metal-solvent catalyst may be cobalt, iron, nickel, or alloys thereof, and the metal-solvent catalyst content of the first bearing pad portion 102 may be about 6 weight % to about 10 weight % (e.g., about 6 weight % to about 8 weight %, about 7 weight % to about 9 weight %, or about 6.5 weight % to about 9.5 weight %), while the metal-solvent catalyst content of the second bearing pad portion 106 may be about 1 weight % to about 6 weight % (e.g., about 1 weight % to about 4 weight %, about 3 weight % to about 6 weight %, or about 2.5 weight % to about 4 weight %).

In another embodiment for imparting differential wear resistance to the first and second bearing pad portions 102 and 106, the composition of catalyst material of the first and second bearing pad portions 102 and 106 may be different. In some embodiments, the first bearing pad portion 102 may include metal-solvent catalyst (e.g., cobalt, iron, nickel, or alloys thereof) interstitially disposed between the bonded-together diamond grains thereof and the second bearing pad portion 106 may be relatively more thermally stable than the first bearing pad portion 102 and include a nonmetallic catalyst interstitially disposed between the bonded-together diamond grains thereof. For example, the nonmetallic catalyst may include at least one metal carbonate catalyst material selected from one or more alkali metal carbonates (e.g., one or more carbonates of Li, Na, and K), one or more alkaline earth metal carbonates (e.g., one or more carbonates of Be, Mg, Ca, Sr, and Ba), and any combination of the foregoing carbonates. In addition to the nonmetallic catalyst, in some cases, at least one metal oxide may be disposed between the bonded diamond grains selected from one or more alkali metal oxides (e.g., one or more oxides of Li, Na, and K), one or more alkaline earth metal oxides (e.g., one or more carbonates of Be, Mg, Ca, Sr, and Ba), and any combination of the foregoing oxides as a result of conversion of the at least one metal carbonate. For example, the content of the nonmetallic catalyst and/or the at least one metal oxide in the second bearing pad portion 106 may be about 0.1 weight % to about 20 weight %, about 0.5 weight % to about 10 weight %, about 1 weight % to about 5 weight %, or about 1.5 weight % to about 3 weight % of the second bearing pad portion 106.

Figure 2:
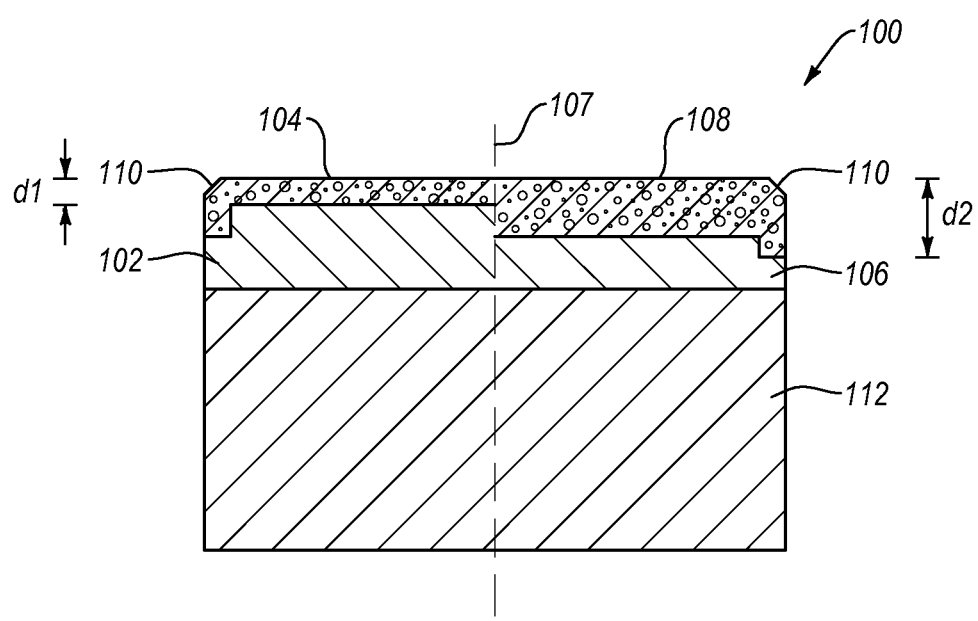
FIG. 2 is a cross-sectional view of an embodiment of a PCD bearing pad in which the first and second bearing pad portions are leached to different depths to impart different wear rates thereto.

Referring to FIG. 2, in another embodiment for imparting differential wear resistance to the first and second bearing pad portions 102 and 106, the composition of catalyst material of the first and second bearing pad portions 102 and 106 may be different due to leaching catalyst material from the first and second bearing pad portions 102 and 106 to different respective degrees (e.g., amount of catalyst material removed) and/or to different respective depths from the superhard bearing surfaces 104 and 108 and/or the chamfer 110 and side surface(s). For example, the leaching may be performed using nitric acid, hydrochloric acid, aqua regia, hydrofluoric acid, mixtures thereof, or another suitable acid. In an embodiment, the first and second bearing pad portions 102 and 106 may exhibit approximately the same average diamond grain size and composition. However, the catalyst material may be depleted from the first bearing pad portion 102 to a depth "d1" and the catalyst material may be depleted from the second bearing pad portion 106 to a depth "d2" that is greater than the depth "d1" to impart greater thermal stability to the second bearing pad portion 106. For example, the depth "d2" may be 1.5 to 3 times greater than the depth "d1." More particularly, the depth "d2" may be about 200 μm to about 600 μm (e.g., about 250 μm to about 400 μm) and the depth "d1" may be about 50 μm to about 150 μm (e.g., about 70 μm to about 120 μm). In other embodiments, the average grain size of the first and second bearing pad portions 102 and 106 may be sized to further tailor wear resistance as previously discussed above, with the first average grain size of the first bearing pad portion 102 being greater than that of the second average grain size of the second bearing pad portion 106. In another embodiment, the first bearing pad portion 102 may be un-leached (i.e., depth "d1" is zero), while the second bearing pad portion 106 may be leached to any of the aforementioned leached depths for the depth "d2."

Figure 3:
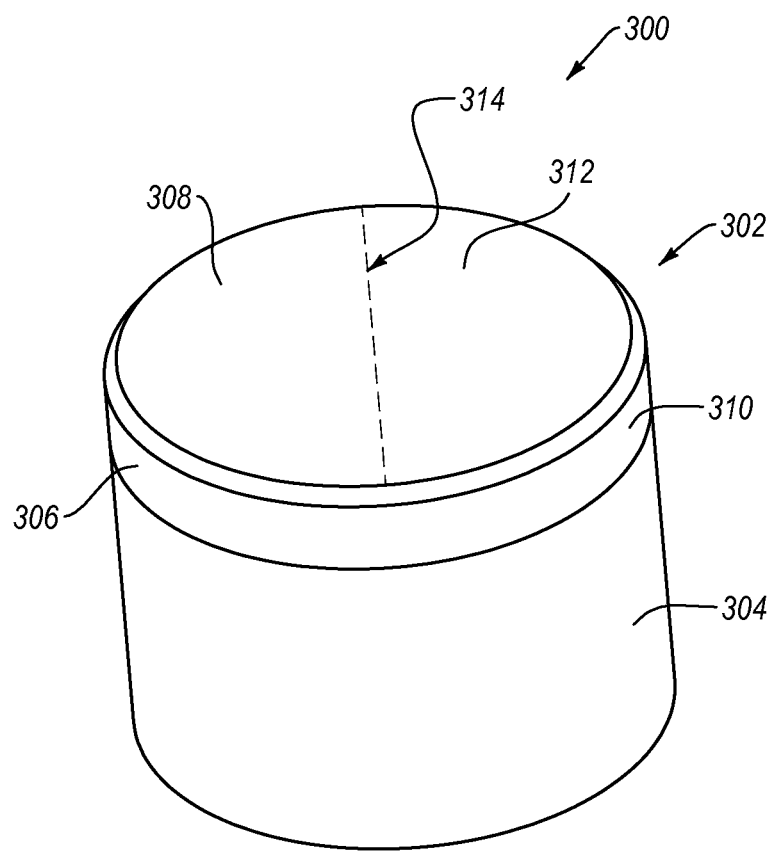
FIG. 3 is an isometric view of another embodiment of a PCD bearing pad including first and second bearing pad portions that exhibit different wear rates.

Although the PCD bearing pad 100 is illustrated as having a wedge-shaped geometry, the inventive PCD bearing pads may exhibit other geometries. FIG. 3 is an isometric view of a generally cylindrical PCD bearing pad 300 according to another embodiment. The PCD bearing pad 300 includes a PCD bearing body/table 302 bonded to a substrate 304. The PCD bearing body 302 includes a first bearing pad portion 306 having a first superhard bearing surface 308 and a second bearing pad portion 310 having a second superhard bearing surface 312. The first bearing pad portion 306 may be configured as described hereinabove with respect to the first bearing pad portion 102 and the second bearing pad portion 310 may be configured as described hereinabove with respect to the second bearing pad portion 106. The substrate 304 may be configured as described hereinabove with respect to the substrate 112.

The first and second bearing pad portions 306 and 310 may be substantially symmetrically arranged about a reference line 314 (e.g., a diameter) or plane of symmetry of the PCD bearing pad 300. However, in other embodiments, the first and second bearing pad portions 306 and 310 may have different geometries and may not be symmetrically arranged about the reference line 314. It is noted that any other suitable geometry may be employed for the PCD bearing pads disclosed herein besides the wedge-shaped PCD bearing pad 100 and the generally cylindrical PCD bearing pad 300. For example, other suitable geometries include rectangular, triangular, elliptical, other oblong shape, or another suitable geometry.

Figure 4:
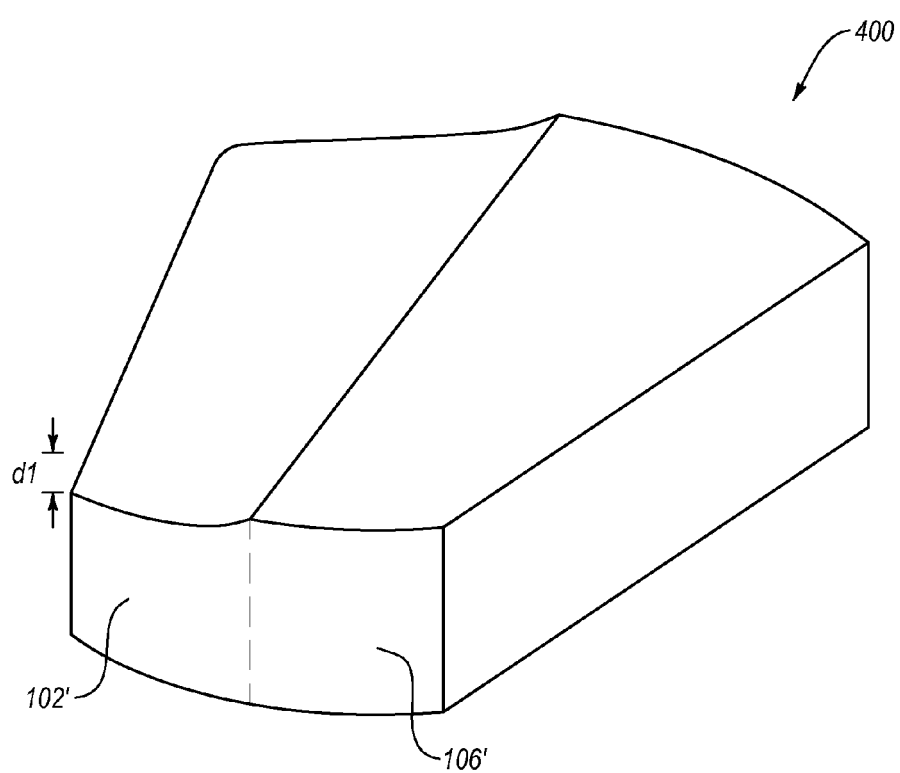
FIG. 4 is an isometric view of a substrateless PCD bearing pad including first and second bearing pad portions that exhibit different wear rates according to another embodiment.

FIG. 4 is an isometric view of a substrateless PCD bearing pad 400 including first and second bearing pad portions 102' and 106' similar to those shown in FIGS. 1A-1C. However, unlike the PCD bearing pad 100 shown in FIGS. 1A-1C, the PCD bearing pad 400 does not include a substrate bonded to the PCD bearing body. In some embodiments, the relative thickness of the first and second bearing pad portions 102' and 106' and the first and second bearing pad portions 102 and 106 may be greater.

Figure 5A:
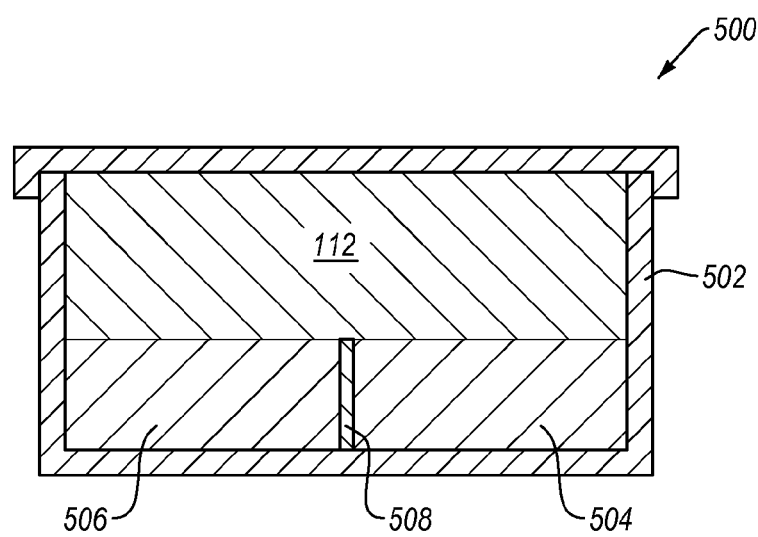
FIG. 5A is a cross-sectional view of an assembly to be high-pressure/high-temperature ("HPHT") processed to form the PCD bearing pad shown in FIG. 1A according to an embodiment.

FIG. 5A is a cross-sectional view of an assembly 500 to be HPHT processed to form the PCD bearing pad 100 shown in FIG. 1A according to an embodiment. The assembly 500 includes a canister 502 (e.g., a refractory metal canister) enclosing a first mass of diamond particles 504 and a second mass of diamond particles 506 spaced by a partition element 508. The substrate 112 may be disposed on the first and second masses of diamond particles 504 and 506. Suitable canister assemblies and sealing techniques are disclosed in U.S. application Ser. No. 11/545,929 filed 10 Oct. 2006, the disclosure of which is incorporated herein, in its entirety, by this reference.

In an embodiment, the first mass of diamond particles 504 comprises a plurality of un-sintered diamond particles exhibiting a first average particle size and the second mass of diamond particles 506 comprises a plurality of un-sintered diamond particles exhibiting a second average particle size less than the first average particle size. For example, the first average particle size may be about 1.2 to about 5 times (e.g., about 1.5 to about 3 times or about 2 to about 4 times) greater than the second average particle size. More particularly, the first average particle size may be about 30 μm to about 100 μm and the second average particle size may be about 2 μm to about 20 μm, such as the first average particle size being about 45 μm to 60 μm and the second average particle size being about 10 μm to about 19 μm. The diamond particles of the first and second masses of diamond particles 504 and 506 may exhibit a substantially uni-modal particle size distribution or a bi-modal or greater particle size distribution.

In an embodiment, the partition element 508 may be a thin metallic disk made from a metal-solvent catalyst, such as cobalt, iron, nickel, or alloys thereof. In another embodiment, the partition element 508 may be made from a sacrificial material that degrades during HPHT processing. In yet another embodiment, the partition element 508 may be made from a barrier material, such as a refractory metal or alloy selected from tungsten, zirconium, niobium, vanadium, molybdenum, tantalum, and alloys thereof.

The assembly 500 may be disposed in a suitable pressure transmitting medium (e.g., a salt structure, a graphite structure, pyrophyllite, or combinations thereof) and subjected to an HPHT process using an ultra-high pressure press (e.g., a cubic or belt press) at a temperature sufficient to partially or completely melt a metallic cementing constituent in the substrate 112 (e.g., cobalt in a cobalt-cemented tungsten carbide substrate) and at a corresponding pressure so that the diamond phase is stable. The HPHT process is performed for a time sufficient to partially or completely melt the metallic cementing constituent in the substrate 112 and infiltrate the first and second masses of diamond particles 504 and 506 to sinter and catalyze formation of PCD from the diamond particles to integrally form the first and second bearing pad portions 102 and 106 (FIG. 1A) together and with the substrate 112. Generally, the temperature may be at least sufficient to at least partially melt the cementing constituent in the substrate 112, such as a temperature of at least about 1300° C. and a pressure of at least about 5 GPa. For example, the temperature may be about 1300° C. to about 1500° C. and a pressure of about 5.5 GPa to about 10 GPa (e.g., about 1400° C. to about 1500° C. and a pressure of about 7 GPa to about 9 GPa such as about 7.5 GPa to about 8.5 GPa). The pressure values disclosed herein refer to the pressure in the pressure transmitting medium that encloses the assembly and is also known as the cell pressure.

If the partition element 508 is made from a metal-solvent catalyst, the partition element 508 also melts and infiltrates into the first and second masses of diamond particles 504 and 506 during HPHT processing, and may be imperceptible after HPHT processing. If the partition element 508 is degradable, the partition element 508 degrades during HPHT processing and may be absent from the final PCD bearing pad 100.

In some embodiments, the substrate 112 may be replaced with one or more layers of catalyst materials made from any of the metallic or nonmetallic catalyst materials disclosed herein. In such an embodiment, a substrateless PCD bearing pad similar to that shown in FIG. 4 may be fabricated.

After HPHT processing, the PCD bearing pad so formed may be removed from the canister 502 and further processed. For example, the chamfer 110 (FIG. 1A-FIG. 1C) may be machined into the first and second bearing pad portions 102 and 106 by grinding, EDM, or combinations thereof. In some embodiments, the offset/transition between the first and second bearing pad portions 102 and 106 may be formed into the first bearing pad portion 102 by EDM, grinding, lapping, or combinations thereof. The superhard bearing surfaces 104 and 108 may be planarized by a suitable planarization technique, such as lapping. In some embodiments, the planarization process may be sufficiently aggressive so that the offset/transition (FIG. 1C) is formed. In other embodiments, the offset/transition may be formed into between the first and second bearing pad portions 102 and 106 during the HPHT processing used to form them, such as by a shaped can assembly. In some embodiments, the substrate 112 may be completely ground away to form a substrateless PCD bearing pad similar to that shown in FIG. 4. In other embodiments, the PCD bearing pad may be subjected to a leaching process that selectively removes catalyst material from the first and second bearing pad portions 102 and 106 to different degrees similar to that shown in FIG. 2.

As an alternative or in addition to tailoring the average particle sizes of the first and second masses of diamond particles, in another embodiment, the first mass of diamond particles 504 may include a first amount of catalyst material mixed therewith and the second mass of diamond particles 506 may include a second amount of catalyst material mixed therewith. The catalyst materials may be a metal-solvent catalyst, such as cobalt, iron, nickel, or alloys thereof. For example, the catalyst material mixed with the diamond particles of the first and second masses of diamond particles 504 and 506 may be in powder form exhibiting a suitable average particle size. For example, the first amount of catalyst material may be about 6 weight % to about 10 weight % (e.g., about 6 weight % to about 8 weight %, about 7 weight % to about 9 weight %, or about 6.5 weight % to about 9.5 weight %) of the combined total of the catalyst material and the first mass of diamond particles, while the second amount of catalyst material may be about 1 weight % to about 6 weight % (e.g., about 1 weight % to about 4 weight %, about 3 weight % to about 6 weight %, or about 2.5 weight % to about 4 weight %) of the combined total of the catalyst material and the second mass of diamond particles.

As an alternative or in addition to tailoring the average particle sizes of the first and second masses of diamond particles, in another embodiment, the catalyst material mixed with the diamond particles of the first mass of diamond particles 504 may be a metal-solvent catalyst (e.g., cobalt, iron, nickel, or alloys thereof) and the catalyst material mixed with the second mass of diamond particles 506 may include at least one metal carbonate catalyst material, such as one or more alkali metal carbonates (e.g., one or more carbonates of Li, Na, and K), one or more alkaline earth metal carbonates (e.g., one or more carbonates of Be, Mg, Ca, Sr, and Ba), or any combination of the foregoing carbonates. In this embodiment, the relative amounts of the catalyst materials mixed with the first and second masses of diamond particles may be approximately the same or may be different.

According to an embodiment, the at least one metal carbonate catalyst material may include a first alkali metal carbonate and at least a second alkali metal carbonate present in selected proportions at or near a eutectic composition for the chemical system defined by the first and at least a second alkali metal carbonates. In an embodiment, the first alkali metal carbonate may be selected from a Group I carbonate (e.g., a carbonate of Li, Na, K, Rb, or Cs) and the at least a second alkali metal carbonate may be selected from one or more Group I carbonates that are different than that of the first alkali metal carbonate. For example, the first alkali metal carbonate and the at least a second alkali metal carbonate may form a binary or greater chemical system that exhibits a eutectic point, and the first alkali metal carbonate and the at least a second alkali metal carbonate may form a eutectic, hypereutectic, or hypoeutectic composition.

According to an embodiment, the at least one metal carbonate catalyst material may comprise lithium carbonate, sodium carbonate, and potassium carbonate. In an embodiment, the lithium carbonate, sodium carbonate, and potassium carbonate may be present in selected proportions at or near a ternary eutectic composition (e.g., a eutectic composition, a hypereutectic composition, or a hypoeutectic composition) for the lithium carbonate-sodium carbonate-potassium carbonate chemical system. In the lithium carbonate-sodium carbonate-potassium carbonate chemical system, the ternary eutectic composition occurs when the lithium carbonate is present in an amount of about 43.5 atomic percent, the sodium carbonate is present in an amount of about 31.5 atomic percent, and the potassium carbonate is present in an amount about 25 atomic percent and the ternary eutectic temperature is about 397° C. at approximately 1 atmosphere and about 1100° C. to about 1300° C. at approximately 7.7 GPa.

Instead of mixing catalyst material with the first and second masses of diamond particles 504 and 506 prior to HPHT processing, in other embodiments, the catalyst material may be infiltrated into the first and/or second masses of diamond particles 504 and 506 during HPHT processing from one or more thin layers of catalyst material positioned between the first and second masses of diamond particles 504 and 506 and the substrate 112 or between the bottom of the canister and the first and second masses of diamond particles 504 and 506. For example, respective thin layers of catalyst material having different compositions may be positioned between the first and second masses of diamond particles 504 and 506 and the substrate 112 or between the bottom of the canister and the first and second masses of diamond particles 504 and 506.

Figure 6A:
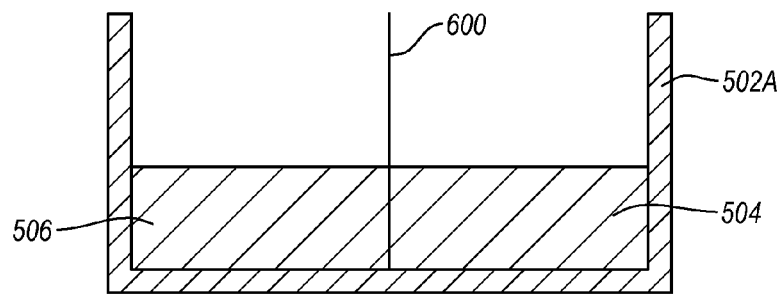
FIGS. 6A-6C are cross-sectional views of an assembly, at different stages, to be HPHT processed to form the PCD bearing pad shown in FIG. 1A according to an embodiment.
Figure 6B:
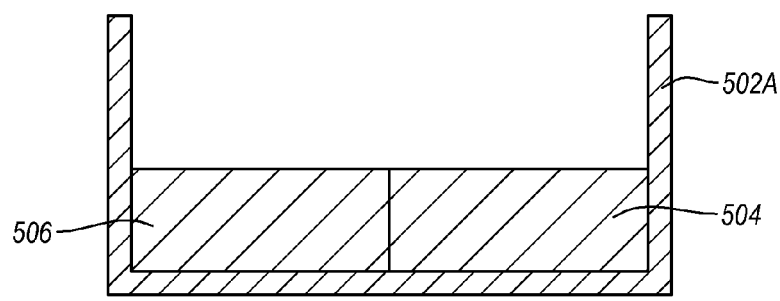
Figure 6C:
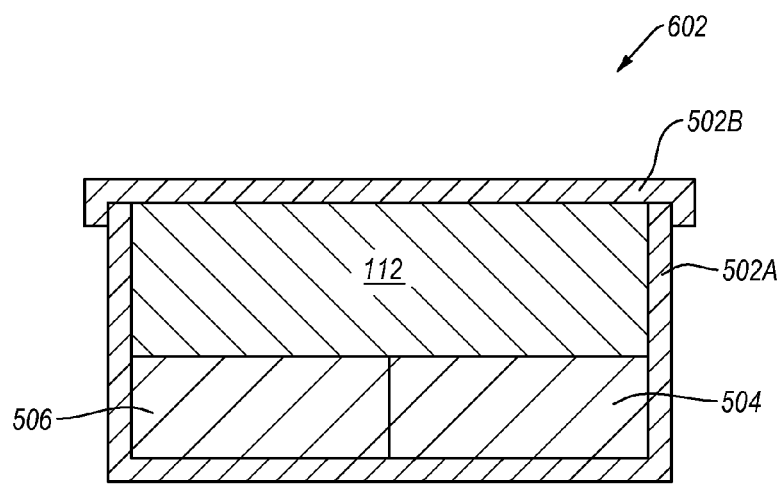

FIGS. 6A-6C are cross-sectional views of an assembly, at different stages, to be HPHT processed to form the PCD bearing pad shown in FIG. 1A according to an embodiment. Referring to FIG. 6A, the first and second masses of diamond particles may be disposed in a receptacle 502A, with a partition 600 physically separating the first and second masses of diamond particles 504 and 506. For example, the partition 600 may be a piece of paper, a thin metal plate, or a spatula. Referring to FIG. 6B, the partition 600 may be carefully removed so that the first and second masses of diamond particles do not significantly mix with one another. Referring to FIG. 6C, the substrate 112 is placed on the first and second masses of diamond particles 504 and 506 and the canister cover 502B may be attached to the receptacle 502A to form an assembly 602. In some embodiments, catalyst material may be mixed with the first and second masses of diamond particles 504 and 506 in the amount(s) and having composition(s) as previously discussed with regard to the assembly 500 shown in FIG. 5A. The assembly 600 may be HPHT processed using the same or similar HPHT conditions used to HPHT process the assembly 500 shown in FIG. 5A.

Figure 5B:
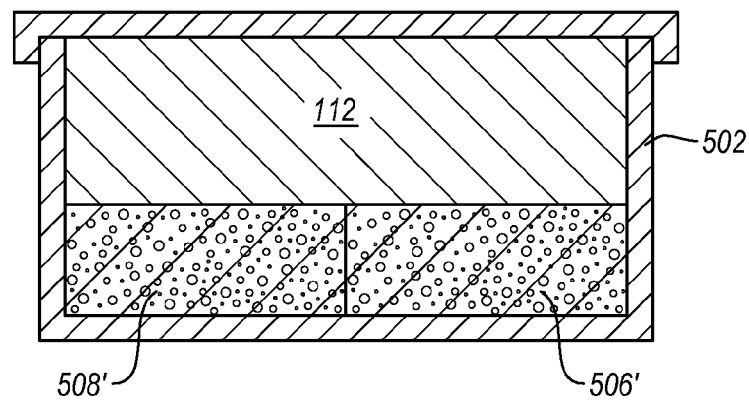
FIG. 5B is a cross-sectional view of an assembly to be HPHT processed to form the PCD bearing pad shown in FIG. 1A according to another embodiment.

Referring now to FIG. 5B, in other embodiments, instead of sintering the first and second masses of diamond particles 504 and 506, preformed pieces of PCD bodies 506' and 508' may be employed. In such embodiments, the partition element 508 may not be needed. For example, a first at least partially leached PCD body 506' having a first average grain size and a second at least partially leached PCD body 508' having a second average grain size that is less than that of the first average grain size may be positioned adjacent to one another and bonded to the substrate 112. The first and second at least partially leached PCD bodies are formed by HPHT sintering diamond particles of suitable particle size in the presence of a metallic or nonmetallic catalyst, followed by leaching the sintered PCD body to at least partially remove the catalyst so that the at least partially leached PCD body is porous therethrough. For example, the first average grain size of the first at least partially leached PCD body may be about 1.2 to about 5 times (e.g., about 1.5 to about 3 times or about 2 to about 4 times) greater than that of the second average grain size of the second at least partially leached PCD body. More particularly, the first average grain size may be about 30 µm to about 100 µm and the second average grain size may about 2 µm to about 20 µm, such as the first average grain size being about 45 µm to 60 µm and the second average grain size being about 10 µm to about 19 µm. In an embodiment, during HPHT processing, the metallic cementing constituent from the substrate 112 may infiltrate into the first and second at least partially leached PCD bodies to bond each to the substrate 112.

In further embodiments, instead of sintering the first and second masses of diamond particles 504 and 506, preformed pieces of PCD bodies sintered with different catalyst compositions and/or catalyst contents may be employed. For example, a first preformed PCD body sintered with any of the disclosed metal-solvent catalysts and a second preformed PCD body sintered with any of the disclosed nonmetallic catalysts may be positioned adjacent to one another as shown in FIG. 5B. The first preformed PCD body includes a plurality of directly bonded-together diamond grains having a metal-solvent catalyst disposed interstitially between the bonded-together diamond grains. The second preformed PCD body includes a plurality of directly bonded-together diamond grains having at least one metal carbonate and/or at least one corresponding metal oxide disposed interstitially between the bonded-together diamond grains. The first and second preformed PCD bodies may be directly bonded to the substrate 112 during HPHT process, via an intermediate bonding layer (e.g., a refractory material layer of Mo, V, W, alloys thereof, or combinations thereof,), or via an intermediate braze alloy layer. For example, suitable techniques for brazing the first and second preformed PCD bodies to the substrate 112 are disclosed in U.S. application Ser. No. 11/545,929 which was previously incorporated by reference.

Suitable braze alloys for the braze alloy layer include gold, silver, copper, or titanium alloys. For example, suitable braze alloys for the braze alloy layer may include gold-tantalum alloys or silver-copper-titanium alloys. In one specific embodiment, a braze alloy for the braze alloy layer may comprise an alloy of about 4.5 weight % titanium, about 26.7 weight % copper, and about 68.8 weight % silver, otherwise known as TICUSIL®, which is currently commercially available from Wesgo Metals, Hayward, Calif. In a further embodiment, a braze alloy for the braze alloy layer may comprise an alloy of about 25 weight % gold, about 37 weight % copper, about 10 weight % nickel, about 15 weight % palladium, and about 13 weight % manganese, otherwise known as PALNICUROM® 10, which is also currently commercially available from Wesgo Metals, Hayward, Calif. Another suitable braze alloy may include about 92.3 weight % nickel, about 3.2 weight % boron, and about 4.5 weight % silicon. Yet another suitable braze alloy may include about 92.8 weight % nickel, about 1.6 weight % boron, and about 5.6 weight % silicon.

Of course, the geometry of the PCD bearing pad 100 fabricated as shown in FIGS. 5A and 5B and FIGS. 6A-6C is only a non-limiting illustrative embodiment. Any of the above-described methods may be used to fabricate PCD bearing pads having other geometries as desired.

Figure 7A:
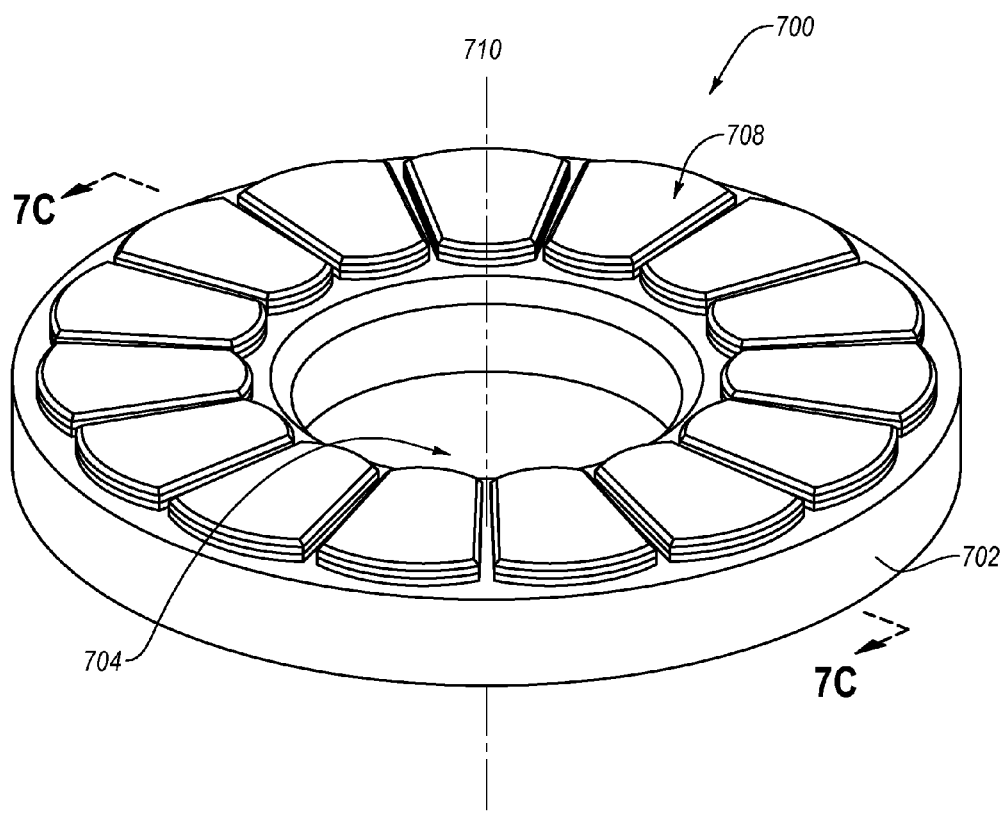
FIG. 7A is a top isometric view of an embodiment of a thrust-bearing assembly including a plurality of the PCD bearing pads shown in FIG. 1A.
Figure 7B:
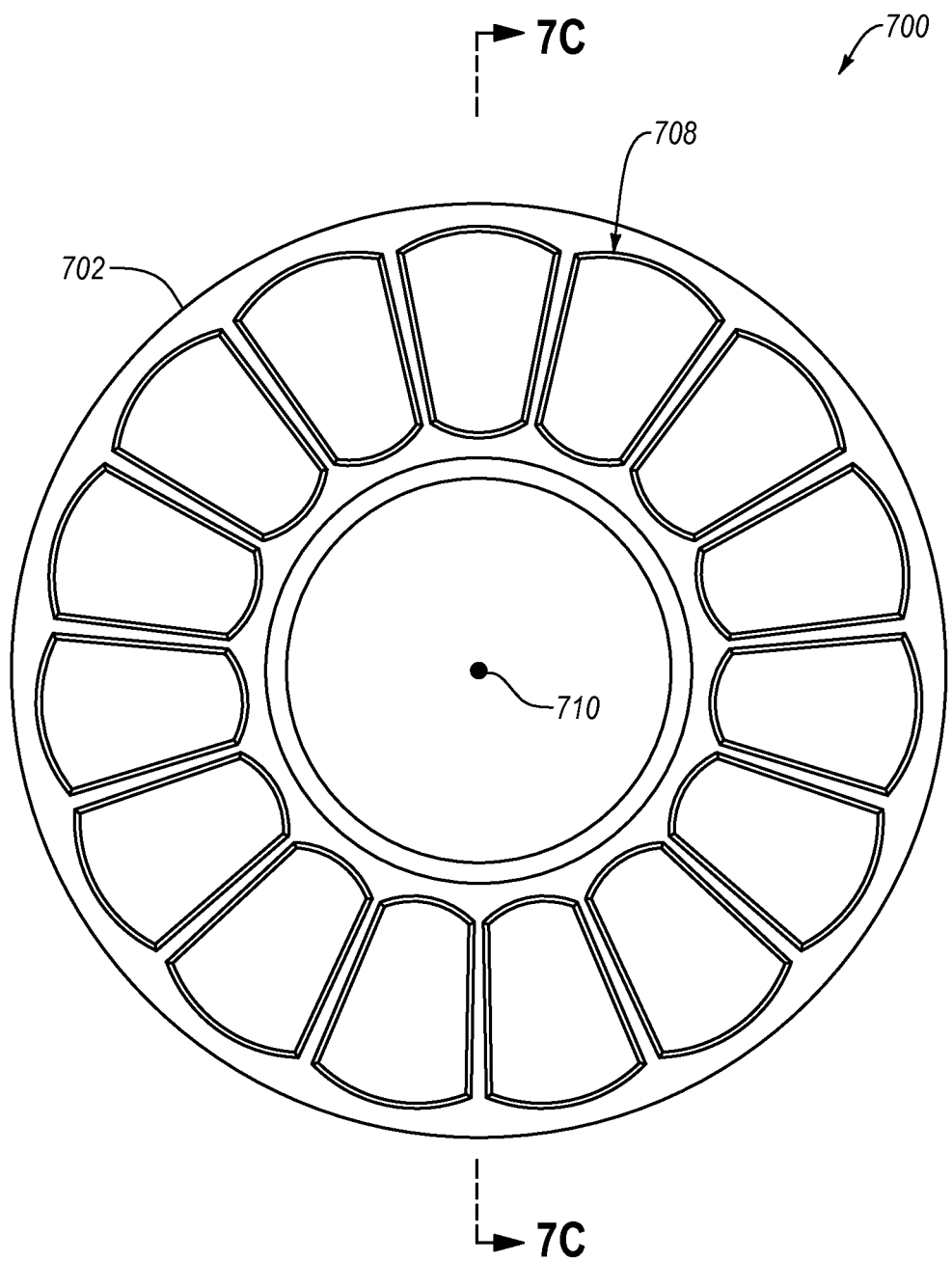
FIG. 7B is a top plan view of the thrust-bearing assembly shown in FIG. 7A.
Figure 7C:
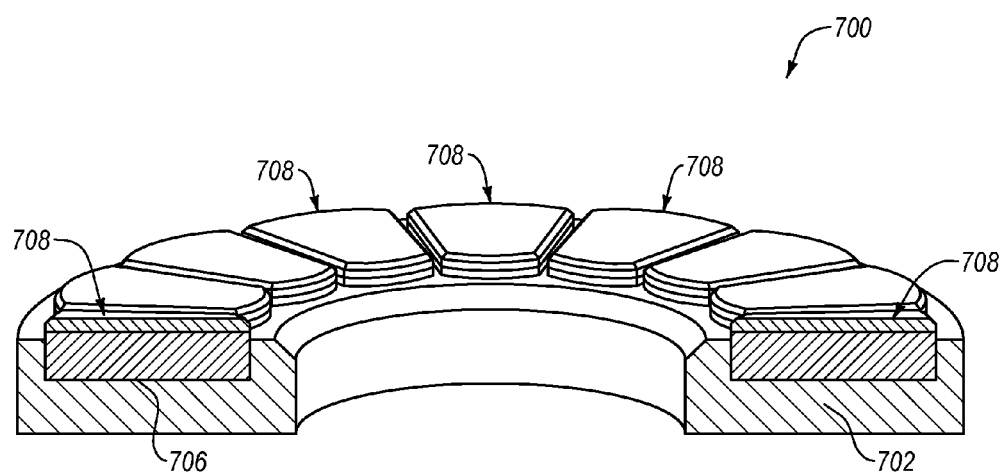
FIG. 7C is a side cross-sectional view of the thrust-bearing assembly shown in FIG. 7B taken along line 7C-7C.

FIGS. 7A-7C are isometric, top plan, and isometric cutaway views of an embodiment of a thrust-bearing assembly 700 that may employ one or more of the PCD bearing pads disclosed herein. The thrust-bearing assembly 700 may form a stator or a rotor of a thrust-bearing apparatus used in a subterranean drilling system. The thrust-bearing assembly 700 includes a support ring 702 defining an opening 704 through which a shaft (not shown) of, for example, a downhole drilling motor may extend. The support ring 702 may be made from a variety of different materials. For example, the support ring 702 may comprise carbon steel, stainless steel, tungsten carbide, or another suitable material. The support ring 702 may include a plurality of recesses 706 (FIG. 7C) formed therein.

The thrust-bearing assembly 700 further includes a plurality of PCD bearing pads 708. At least one, some, or all of the PCD bearing pads 708 may be configured according to any of the inventive PCD bearing pads disclosed herein. For example, one or more of PCD bearing pads 708 may be configured as described herein with respect to the PCD bearing pads 100 shown in FIG. 1A, or any of the PCD bearing pad embodiments disclosed herein may be employed. The PCD bearing pads 708 are illustrated in FIG. 7A being distributed circumferentially about a thrust axis 710 along which a thrust force may be generally directed during use. Each PCD bearing pad 708 may be partially disposed in a corresponding one of the recesses 706 (FIG. 7C) of the support ring 702 and secured partially therein via brazing, press-fitting, fastening with a fastener, or another suitable technique. In other embodiments, a retention ring (not shown) may be configured to secure the PCD bearing pads 708 between the support ring and the retention ring as disclosed in U.S. application Ser. No. 12/761,535 filed 16 Apr. 2010, which is incorporated herein, in its entirety, by this reference.

Figure 8:
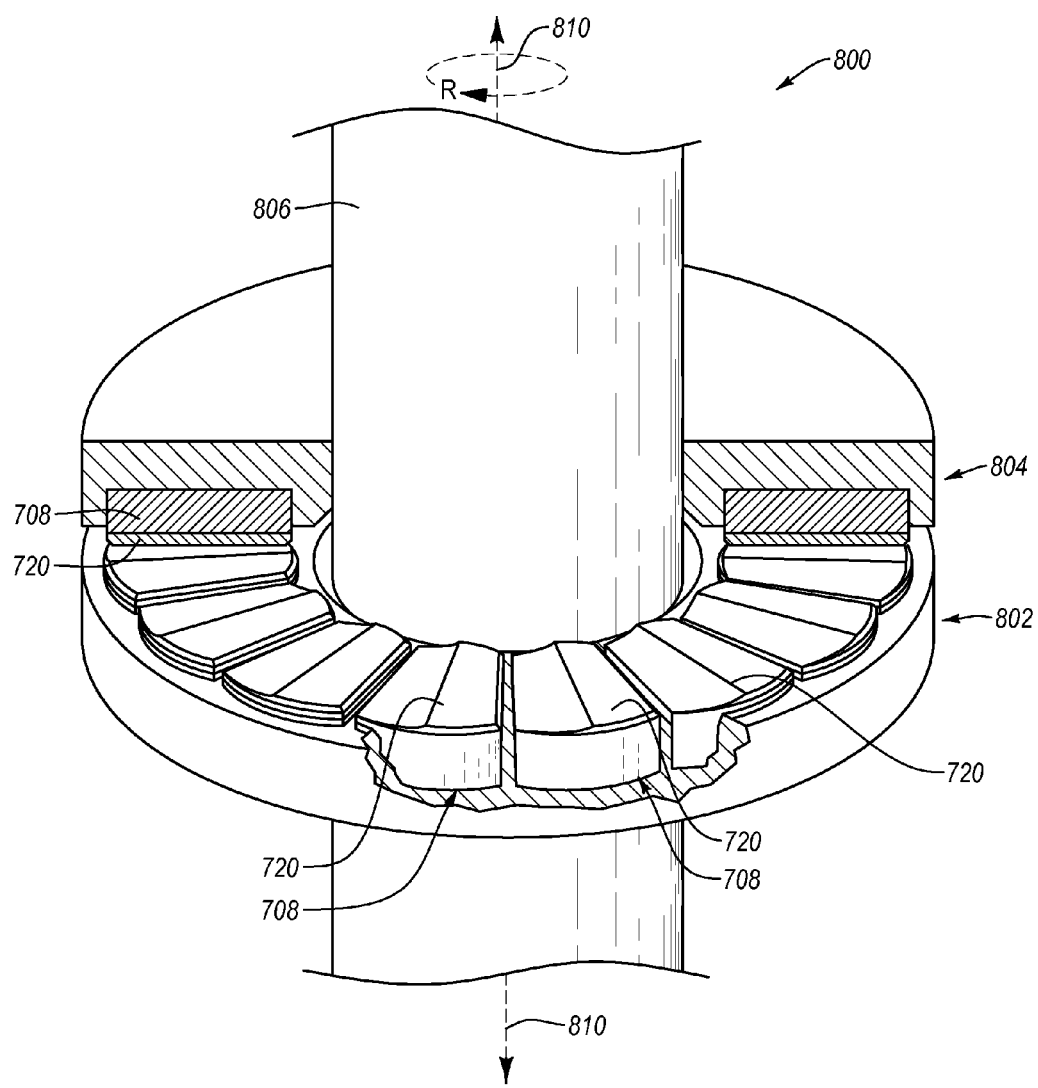
FIG. 8 is an isometric cutaway view of an embodiment of a thrust-bearing apparatus that may include a stator and rotor configured as the thrust-bearing apparatus shown in FIGS. 7A-7C.

FIG. 8 is an isometric cutaway view of a thrust-bearing apparatus 800 that may utilize any of the disclosed thrust-bearing assemblies according to an embodiment. The thrust-bearing apparatus 800 includes a stator 802 that may be configured as the thrust-bearing assembly 700 shown in FIGS. 7A-7C and a rotor 804 that may also be configured as the thrust-bearing assembly 700 shown in FIGS. 7A-7C. However, in other embodiments, the stator 802 may include conventional PDC bearing pads instead of the inventive PCD bearing pads disclosed herein. The rotor 804 may be attached to and rotate with a shaft 806.

The shaft 806 may, for example, be operably coupled to an apparatus capable of rotating the shaft 806 in a direction R (or in an opposite direction) about a rotation axis 810, such as a downhole motor. For example, the shaft 806 may extend through and may be secured to the rotor 804 by press-fitting or threadly coupling the shaft 806 of the rotor 804, or another suitable technique. The stator 802 may not be connected to the shaft 806 and, therefore, may remain stationary while the rotor 804 rotates. The respective superhard bearing surfaces 720 of the PCD bearing pads 708 of the rotor 804 may be oriented to generally oppose and contact respective superhard bearing surfaces 720 of the PCD bearing pads 708 of the stator 802. Due to the offset/transition (see FIG. 1C) that develops on the PCD bearing pads 708 during use, fluid film formation between the superhard bearing surfaces 720 of the PCD bearing pads 708 of the rotor 804 and the superhard bearing surfaces 720 of the PCD bearing pads 708 of the stator 802 is promoted which helps lubricate the superhard bearing surfaces 720 to enhance the operational lifetime of the thrust-bearing apparatus 800.

Figure 9A:
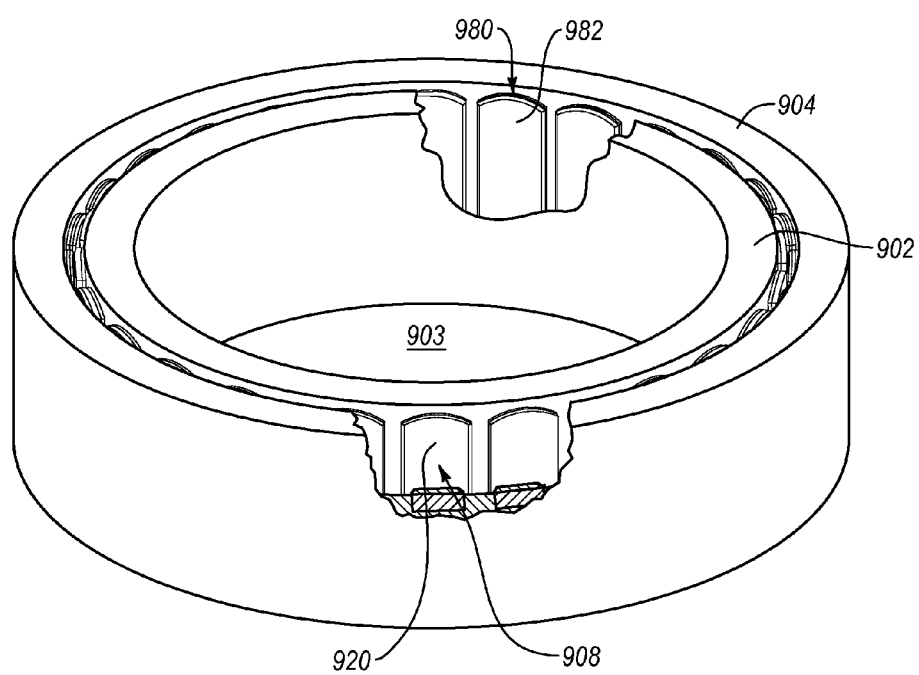
FIG. 9A is an isometric cutaway view of an embodiment of a radial bearing apparatus that may include a stator and rotor including PCD bearing pads having first and second bearing pad portions exhibiting different wear rates.
Figure 9B:
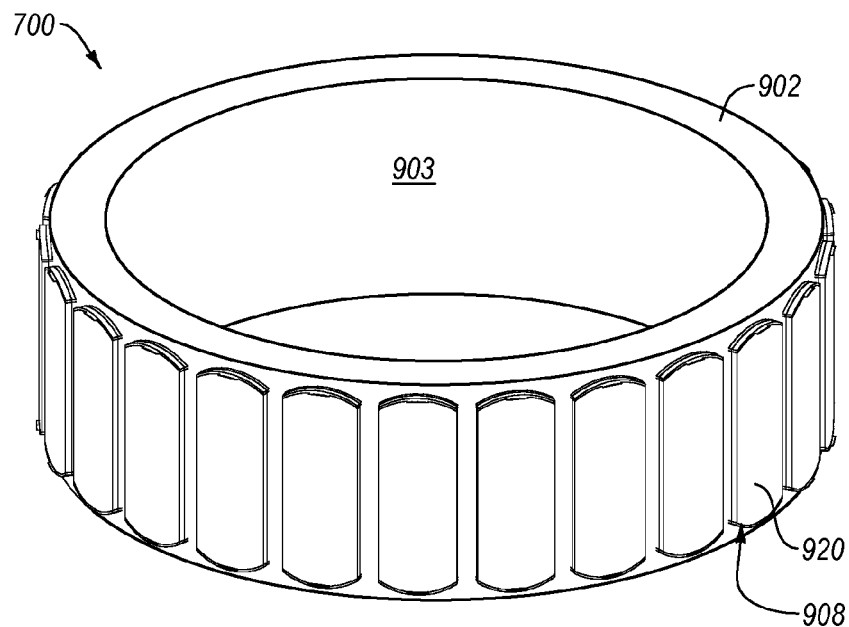
FIG. 9B is an exploded isometric view of the radial bearing apparatus shown in FIG. 9A.
Figure 9B:
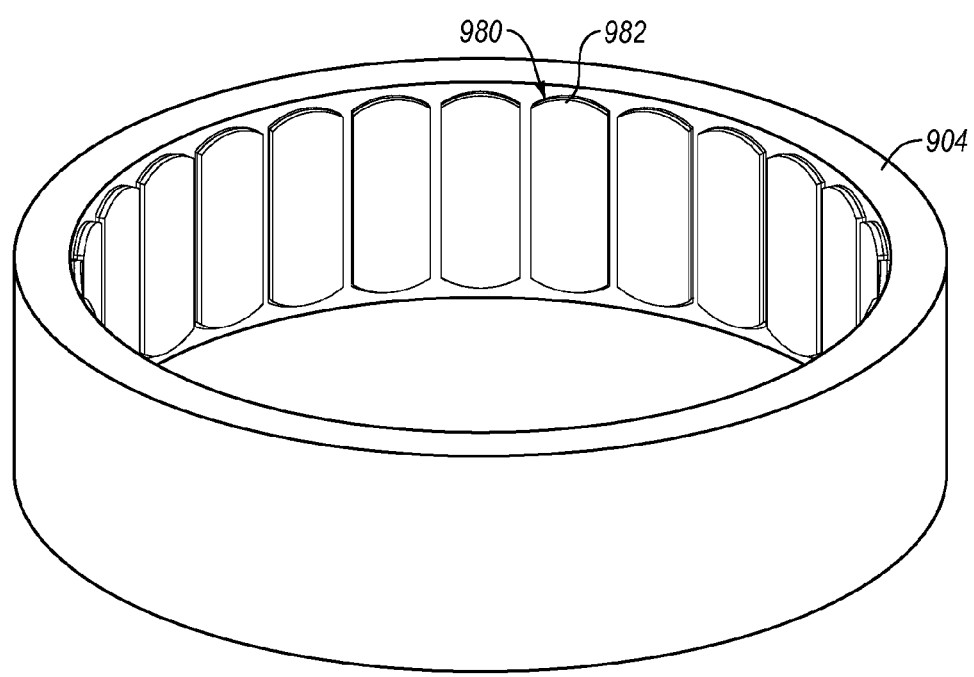

FIGS. 9A and 9B are isometric cutaway and exploded isometric views, respectively, of a radial bearing apparatus 900 according to an embodiment. The radial bearing apparatus 900 may include an inner race 902 (i.e., a stator). The inner race 902 may define an opening 903 and may include a plurality of circumferentially distributed PCD bearing pads 908, each of which includes a convexly-curved superhard bearing surface 920. The radial bearing apparatus 900 may further include an outer race 904 (i.e., a rotor) that extends about and receives the inner race 902. The outer race 904 may include a plurality of circumferentially-spaced PCD bearing pads 980, each of which may include a concavely-curved superhard bearing surface 982 curved to generally correspond to the convexly-curved superhard bearing surfaces 920 of the PCD bearing pads 908 of the inner race 902. The terms "rotor" and "stator" refer to rotating and stationary components of the radial-bearing apparatus 900, respectively. Thus, if the outer race 904 is configured to remain stationary, the outer race 904 may be referred to as the stator and the inner race 902 may be referred to as the rotor.

The radial bearing apparatus 900 may be employed in a variety of mechanical applications including motors, turbines, or any other device capable of rotating a shaft. For example, so-called "roller cone" rotary drill bits may benefit from a radial bearing apparatus disclosed herein. More specifically, the inner race 902 may be mounted or affixed to a spindle or a roller cone and the outer race 904 may be affixed to an inner bore formed within a cone and that such the outer race 904 and the inner race 902 may be assembled to form a radial bearing apparatus.

Figure 10:
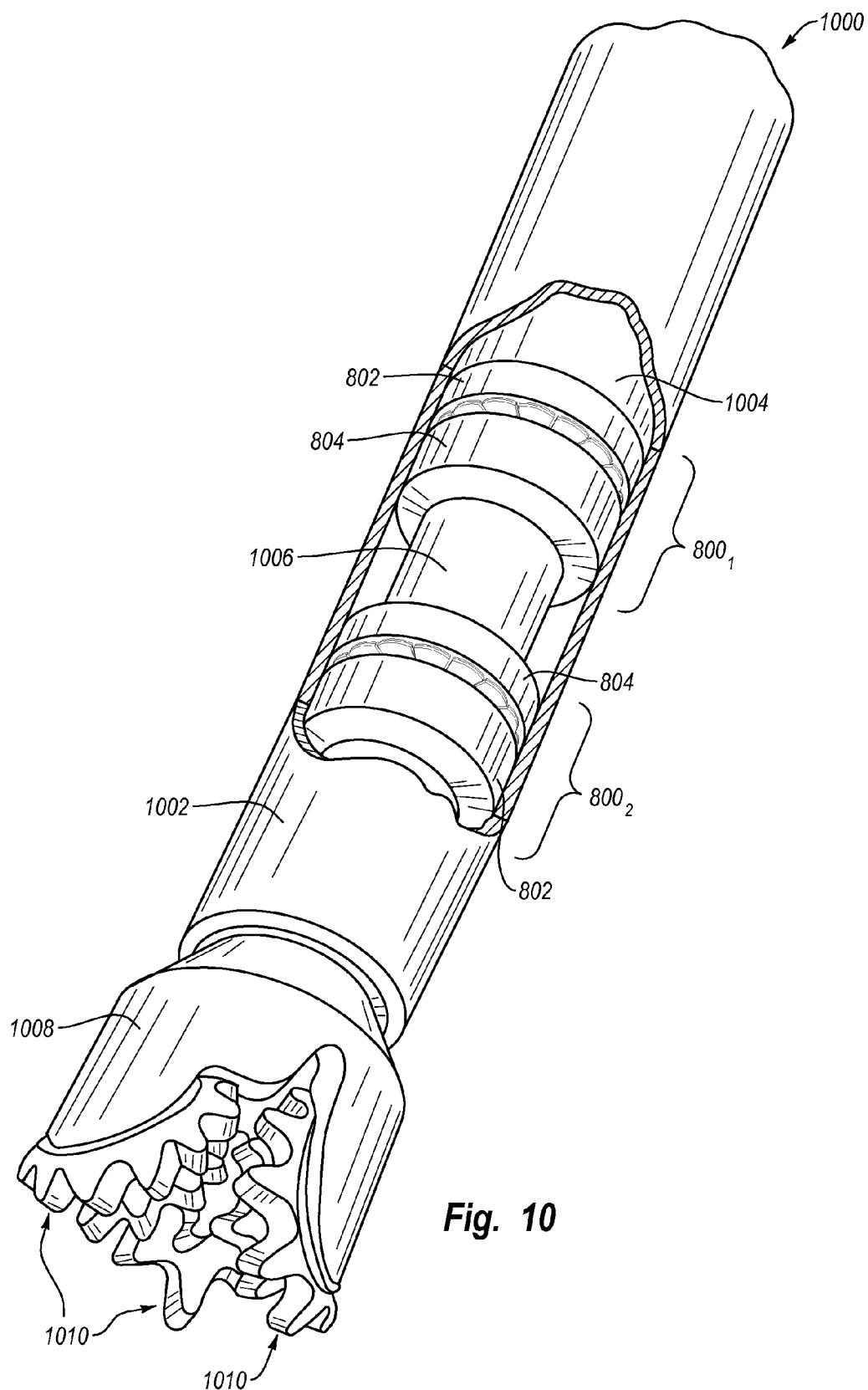
FIG. 10 is a schematic isometric cutaway view of an embodiment of a subterranean drilling assembly that may include one or more of the disclosed bearing apparatuses.

Any of the embodiments of thrust-bearing apparatuses and radial bearing apparatuses disclosed herein may be used in a subterranean drilling system. FIG. 10 is a schematic isometric cutaway view of a subterranean drilling system 1000 that includes one or more of the disclosed thrust-bearing apparatuses, such as the thrust-bearing apparatus 800 shown in FIG.

8. The subterranean drilling system 1000 may include a housing 1002 enclosing a downhole drilling motor 1004 (i.e., a motor, turbine, or any other device capable of rotating an output shaft) that may be operably connected to an output shaft 1006. A first thrust-bearing apparatus $800_1$ may be operably coupled to the downhole drilling motor 1004. A second thrust-bearing apparatus $800_2$ may be operably coupled to the output shaft 1006. A rotary drill bit 1008 configured to engage a subterranean formation and drill a borehole may be connected to the output shaft 1006. The rotary drill bit 1008 is shown as a roller cone bit including a plurality of roller cones 1010. However, other embodiments may utilize different types of rotary drill bits, such as a so-called "fixed cutter" drill bit. As the borehole is drilled with the rotary drill bit 1008, pipe sections may be connected to the subterranean drilling system 1000 to form a drill string capable of progressively drilling the borehole to a greater depth within the earth.

A first one of the thrust-bearing assemblies 804 of the thrust-bearing apparatus $800_1$ may be configured as a rotor that may be attached to the output shaft 1006 and rotates with the output shaft 1006 and a second one of the thrust-bearing assemblies 802 of the thrust-bearing apparatus $800_1$ may be configured as a stator that does not rotate. The on-bottom thrust generated when the drill bit 1008 engages the bottom of the borehole may be carried, at least in part, by the first thrust-bearing apparatus $800_1$. A first one of the thrust-bearing assemblies 804 of the thrust-bearing apparatus $800_2$ may be configured as a rotor that may be attached to the output shaft 1006 and rotates with the output shaft 1006 and a second one of the thrust-bearing assemblies 802 of the thrust-bearing apparatus $800_2$ may be configured as a stator that does not rotate. Fluid flow through the power section of the downhole drilling motor 1004 may cause what is commonly referred to as "off-bottom thrust," which may be carried, at least in part, by the second thrust-bearing apparatus $800_2$.

In operation, drilling fluid may be circulated through the downhole drilling motor 1004 to generate torque and effect rotation of the output shaft 1006 and the rotary drill bit 1008 attached thereto so that a borehole may be drilled. A portion of the drilling fluid may also be used to lubricate opposing bearing surfaces of the bearing surfaces of the thrust-bearing assemblies.

Although the bearing assemblies and bearing apparatuses described above have been discussed in the context of subterranean drilling systems and applications, in other embodiments, the bearing assemblies and bearing apparatuses disclosed herein are not limited to such use and may be used for many different applications, if desired, without limitation. Thus, such bearing assemblies and bearing apparatuses are not limited for use with subterranean drilling systems and may be used with various other mechanical systems, without limitation. For example, pumps or turbines may benefit from and employ a thrust-bearing or a radial bearing apparatus disclosed herein.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A polycrystalline diamond bearing pad for use in a bearing assembly, comprising:

a polycrystalline diamond bearing pad body defining at least one side surface and an upper surface, the polycrystalline diamond bearing pad body including a plurality of directly-bonded together diamond grains, the polycrystalline diamond bearing pad body further including:
a first bearing pad portion including a first superhard bearing surface exhibiting a first wear resistance; and
a second bearing pad portion including a second superhard bearing surface exhibiting a second wear resistance greater than the first wear resistance, wherein the first superhard bearing surface and the second superhard bearing surface at least partially define the upper surface of the polycrystalline diamond bearing pad body.

2. The polycrystalline diamond bearing pad of claim 1 wherein the first bearing pad portion exhibits at least one of a diamond grain size or a composition that differs from the second bearing pad portion so that the first bearing pad exhibits a different wear rate than the second bearing pad portion.

3. The polycrystalline diamond bearing pad of claim 1 wherein the first bearing pad portion exhibits a first average grain size, and the second bearing pad portion exhibits a second average grain size that is less than that of the first average grain size.

4. The polycrystalline diamond bearing pad of claim 3 wherein the first average grain size is about 1.5 to about 3 times greater than that of the second average grain size.

5. The polycrystalline diamond bearing pad of claim 4 wherein the first average grain size is about 30 μm to about 100 μm and the second average grain size is about 2 μm to about 20 μm.

6. The polycrystalline diamond bearing pad of claim 1 wherein the first bearing pad portion exhibits a first composition, and the second bearing pad portion exhibits a second composition that is different than that of the first composition.

7. The polycrystalline diamond bearing pad of claim 6 wherein the first composition comprises more metal-solvent catalyst than the second composition.

8. The polycrystalline diamond bearing pad of claim 6 wherein the first bearing pad portion comprises polycrystalline diamond including a metal-solvent catalyst distributed therethrough, and the second bearing pad portion comprises polycrystalline diamond including at least one nonmetallic catalyst and/or at least one metal oxide distributed therethrough.

9. The polycrystalline diamond bearing pad of claim 1 wherein the diamond bearing pad body forms a table bonded to a substrate.

10. The polycrystalline diamond bearing pad of claim 1 wherein the first bearing pad portion forms a leading edge of the polycrystalline diamond bearing pad adjacent to the second bearing pad portion.

11. The polycrystalline diamond bearing pad of claim 1 wherein the first superhard bearing surface is offset from the second superhard bearing surface of the second bearing pad portion by a distance.

12. The polycrystalline diamond bearing pad of claim 11 wherein the distance is about 50 μm to about 500 μm.

13. The polycrystalline diamond bearing pad of claim 1 wherein each of the first and second superhard bearing surfaces is substantially planar.

14. The polycrystalline diamond bearing pad of claim 1 wherein each of the first and second superhard bearing surfaces is convex or concave.

15. The polycrystalline diamond bearing pad of claim 1 wherein the first bearing pad portion and the second bearing pad portion are substantially symmetric about a plane of symmetry.

16. The polycrystalline diamond bearing pad of claim 1 wherein the first bearing pad portion and the second bearing pad portion are asymmetric.

17. The polycrystalline diamond bearing pad of claim 1 wherein the first and second bearing pad portions extend laterally from an interface therebetween to respective edges.

18. A bearing assembly for use in a subterranean drilling system, comprising:
   a support ring; and
   a plurality of polycrystalline diamond bearing pads mounted to the support ring, the plurality of polycrystalline diamond bearing pads distributed circumferentially about an axis, a number of the plurality of polycrystalline diamond bearing pads including a polycrystalline diamond bearing pad body defining at least one side surface and an upper surface, the polycrystalline diamond bearing pad body including a plurality of directly-bonded together diamond grains, the polycrystalline diamond bearing pad body further including:
      a first bearing pad portion including a first superhard bearing surface exhibiting a first wear resistance; and
      a second bearing pad portion including a second superhard bearing surface exhibiting a second wear resistance greater than the first wear resistance, wherein the first bearing surface and the second bearing surface at least partially define the upper surface of the polycrystalline diamond bearing pad body.

19. The bearing assembly of claim 18 wherein the axis is a thrust axis, and wherein the support ring and the plurality of polycrystalline diamond bearing pads define a thrust-bearing assembly.

20. The bearing assembly of claim 18 wherein the axis is a rotation axis, and wherein the support ring and the plurality of polycrystalline diamond bearing pads define a radial bearing assembly.

21. The bearing assembly of claim 18 wherein the first bearing pad portion exhibits at least one of diamond grain size or composition that differs from the second bearing pad portion so that the first bearing pad portion exhibits a different wear rate than the second bearing pad portion.

22. The bearing assembly of claim 18 wherein the first bearing pad portion exhibits a first average grain size, and the second bearing pad portion exhibits a second average grain size that is less than that of the first average grain size.

23. The bearing assembly of claim 22 wherein the first average grain size is about 1.5 to about 3 times greater than that of the second average grain size.

24. The bearing assembly of claim 22 wherein the first average grain size is about 30 µm to about 100 µm and the second average grain size is about 2 µm to about 20 µm.

25. The bearing assembly of claim 18 wherein the first bearing pad portion exhibits a first composition, and the second bearing pad portion exhibits a second composition that is different than that of the first composition.

26. The bearing assembly of claim 25 wherein the first composition comprises more metal-solvent catalyst than the second composition.

27. The bearing assembly of claim 25 wherein the first bearing pad portion comprises polycrystalline diamond including a metal-solvent catalyst distributed therethrough, and the second bearing pad portion comprises polycrystalline diamond including at least one nonmetallic catalyst and/or at least one metal oxide distributed therethrough.

28. The bearing assembly of claim 18 wherein the polycrystalline diamond bearing pad body forms a table bonded to a substrate.

29. The bearing assembly of claim 18 wherein the first bearing pad portion forms a leading edge adjacent to the second bearing pad portion.

30. The bearing assembly of claim 18 wherein the first superhard bearing surface is offset from the second superhard bearing surface by a distance.

31. A bearing apparatus for use in a subterranean drilling system, comprising:
   a first bearing assembly including,
   a support ring; and
   a plurality of first superhard bearing elements mounted to the support ring, the plurality of first polycrystalline superhard bearing elements distributed circumferentially about an axis, a number of the plurality of first superhard bearing elements including a polycrystalline diamond bearing pad body defining at least one side surface and an upper surface, the polycrystalline diamond bearing pad body including a plurality of directly-bonded together diamond grains, wherein the polycrystalline diamond bearing pad body further includes:
      a first bearing pad portion including a first superhard bearing surface exhibiting a first wear resistance; and
      a second bearing pad portion including a second superhard bearing surface exhibiting a second wear resistance greater than the first wear resistance, wherein the first superhard bearing surface and the second superhard bearing surface at least partially define the upper surface of the polycrystalline diamond bearing pad body; and
   a second bearing assembly including a plurality of second superhard bearing elements generally opposing the plurality of first superhard bearing elements of the first bearing assembly and distributed circumferentially about the axis.

32. A motor assembly for use in a subterranean drilling system, comprising:
   a motor operable to apply torque to a rotary drill bit; and
   a bearing apparatus operably coupled to the motor, the bearing apparatus including a rotor and a stator; and
   wherein at least one of the rotor or the stator comprises:
      a support ring; and
      a plurality of polycrystalline diamond bearing pads mounted to the support ring, the plurality of polycrystalline diamond bearing pads distributed circumferentially about an axis, a number of the plurality of polycrystalline diamond bearing pads including a polycrystalline diamond bearing pad body defining at least one side surface and an upper surface, the polycrystalline diamond bearing pad body including a plurality of directly-bonded together diamond grains, the polycrystalline diamond bearing pad body further including:
         a first bearing pad portion including a first superhard bearing surface exhibiting a first wear resistance; and
         a second bearing pad portion including a second superhard bearing surface exhibiting a second wear resistance greater than the first wear resistance, wherein the first superhard bearing surface and the second superhard bearing surface at least partially define the upper surface of the polycrystalline diamond bearing pad body.

* * * * *

UNITED STATES PATENT AND TRADEMARK OFFICE
CERTIFICATE OF CORRECTION

PATENT NO. : 8,678,657 B1
APPLICATION NO. : 13/267027
DATED : March 25, 2014
INVENTOR(S) : Knuteson et al.

Page 1 of 1

It is certified that error appears in the above-identified patent and that said Letters Patent is hereby corrected as shown below:

In the Claims

In Column 16, Claim 31, Line 16, delete "first polycrystalline" and insert -- first --, therefor.

Signed and Sealed this
Seventh Day of July, 2015

Michelle K. Lee
*Director of the United States Patent and Trademark Office*